(12) United States Patent
Kida et al.

(10) Patent No.: US 10,300,708 B2
(45) Date of Patent: May 28, 2019

(54) INK JET COMPOSITION, HOUSING, AND INK JET METHOD

(71) Applicant: Seiko Epson Corporation, Tokyo (JP)

(72) Inventors: Hiroaki Kida, Shiojiri (JP); Naoyuki Toyoda, Suwa (JP); Masaru Terada, Suwa (JP)

(73) Assignee: Seiko Epson Corporation (JP)

( * ) Notice: Subject to any disclaimer, the term of this patent is extended or adjusted under 35 U.S.C. 154(b) by 73 days.

(21) Appl. No.: 15/242,731

(22) Filed: Aug. 22, 2016

(65) Prior Publication Data

US 2017/0058138 A1 Mar. 2, 2017

(30) Foreign Application Priority Data

Aug. 27, 2015 (JP) ................. 2015-168296

(51) Int. Cl.
*B41J 2/01* (2006.01)
*C09D 11/36* (2014.01)
*B41J 2/21* (2006.01)
*C09D 11/101* (2014.01)
*C09D 11/322* (2014.01)

(52) U.S. Cl.
CPC ............. *B41J 2/2107* (2013.01); *B41J 2/01* (2013.01); *C09D 11/101* (2013.01); *C09D 11/322* (2013.01); *C09D 11/36* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 11/0015; B41J 11/002; B41J 2/2056; B41J 2/21; B41J 2/0057; B41J 3/60; B41J 2002/012; B41J 2/04598; B41J 2/04586; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
See application file for complete search history.

(56) References Cited

U.S. PATENT DOCUMENTS

| | | | | |
|---|---|---|---|---|
| 8,313,572 B2* | 11/2012 | Oyanagi | .............. | C09D 11/322 106/31.86 |
| 9,039,829 B2 | 5/2015 | Takenaka et al. | | |
| 2010/0183809 A1* | 7/2010 | Oyanagi | ................... | C09C 1/62 427/256 |
| 2010/0289859 A1* | 11/2010 | Oyanagi | ................ | C09D 11/36 347/102 |
| 2011/0025783 A1* | 2/2011 | Oyanagi | ................ | C09C 1/622 347/54 |
| 2015/0112003 A1* | 4/2015 | Toyoda | ................ | C09D 17/006 106/493 |

FOREIGN PATENT DOCUMENTS

JP   2011-246718 A   12/2011

* cited by examiner

*Primary Examiner* — Manish S Shah
(74) *Attorney, Agent, or Firm* — Harness, Dickey & Pierce, P.L.C.

(57) ABSTRACT

A non-aqueous ink jet composition includes a surface-treated metal powder, wherein a dissolved oxygen reduction rate is 2.0 kPa/h or more and 20.0 kPa/h or less in an environment of 25° C. and 1.0 atm.

19 Claims, 3 Drawing Sheets

INK JET COMPOSITION, HOUSING, AND INK JET METHOD

BACKGROUND

1. Technical Field

The present invention relates to an ink jet composition, a housing, and an ink jet method.

2. Related Art

Ink jet recording methods are capable of recording high-definition images with a comparatively simple apparatus, and have undergone rapid development in various fields. In this development, various studies have been carried out to obtain high-quality recorded matter in a more stable manner.

For example, JP-A-2011-246718 has an object of providing a flaky thin film fine powder dispersion wherein a flaky thin film fine powder is subjected to a treatment in which the flaky thin film fine powder does not easily settle and the resultant is used in a metallic pigment in which the flaky thin film fine powder is dispersed in ink, and as a result, nozzle clogging is prevented and it is possible to obtain printed matter with a rich metallic luster. JP-A-2011-246718 describes a flaky thin film fine powder dispersion in which a flaky thin film fine powder formed by fine grinding a metal simple substance, an alloy, or a metal compound is contained in a solvent, the average length diameter of the flaky thin film fine powder is 0.5 µm or more and 5.0 µm or less, the maximum length diameter thereof is 10 µm or less, the average thickness thereof is 5 nm or more and 100 nm or less, and the aspect ratio thereof is 20 or more.

In the ink composition which includes a metal powder described in JP-A-2011-246718, the storage stability of the ink composition is not good due to the surface of the metal powder having a high activity with respect to water or the like which is included in the ink composition. In addition, the discharge stability is also not good when continuously discharging the ink composition using an ink jet method due to a product such as gas generated by the reaction between the surface of the metal powder and the moisture and the like.

SUMMARY

An advantage of some aspects of the invention is to provide an ink composition with excellent discharge stability and storage stability, a housing which stores the ink composition, and an ink jet method which uses the ink composition even in a case of using an ink composition which includes a metal powder.

As a result of intensive studies, the present inventors found that, by using an ink jet composition which includes a surface-treated metal powder and where the dissolved oxygen reduction rate is within a predetermined range, the ink jet composition had excellent discharge stability and storage stability, thereby completing the invention.

That is, the invention is as follows.

[1] A non-aqueous ink jet composition including a surface-treated metal powder, in which a dissolved oxygen reduction rate is 2.0 kPa/h or more and 20.0 kPa/h or less in an environment of 25° C. and 1.0 atm.

[2] The non-aqueous ink jet composition according to [1], in which the surface-treated metal powder includes aluminum or an aluminum alloy where a part of a surface of the metal powder is exposed.

[3] The non-aqueous ink jet composition according to [1] or [2], in which the surface-treated metal powder is surface-treated with one type or two or more types of surface treatment agent selected from a group consisting of fluorine-containing phosphoric acid esters, silanol-modified silicone, fluorine-containing silane compounds, and alkyl phosphoric acid esters.

[4] The non-aqueous ink jet composition according to any one of [1] to [3], in which a shape of the surface-treated metal powder is flakes.

[5] The non-aqueous ink jet composition according to any one of [1] to [4], in which the non-aqueous ink jet composition is a solvent-based composition, or a radiation-curable composition.

[6] The non-aqueous ink jet composition according to any one of [1] to [5], in which the surface-treated metal powder is 0.5 mass % or more and 10.0 mass % or less with respect to a total amount of the ink jet composition.

[7] The non-aqueous ink jet composition according to any one of [4] to [6], in which an average thickness of the surface-treated metal powder is 1.0 nm or more and 100.0 nm or less, and an average particle diameter of the surface-treated metal powder is 0.1 µm or more and 300.0 µm or less.

[8] A housing including the non-aqueous ink jet composition according to any one of [1] to [7]; and a container which stores the ink jet composition.

[9] An ink jet method including: discharging the non-aqueous ink jet composition according to any one of [1] to [7] from an ink jet head.

BRIEF DESCRIPTION OF THE DRAWINGS

The invention will be described with reference to the accompanying drawings, wherein like numbers reference like elements.

DESCRIPTION OF EXEMPLARY EMBODIMENTS

Detailed description will be given below of aspects (referred to below as "the present embodiment") for embodying the invention. The present embodiment below is an example for illustrating the invention and the invention is not limited to the content below. The invention can be appropriately modified within the scope thereof.

Ink Jet Composition

A non-aqueous ink jet composition of the present embodiment (referred to below simply as "composition") includes a surface-treated metal powder, in which a dissolved oxygen reduction rate is 2.0 kPa/h or more and 20.0 kPa/h or less in an environment of 25° C. and 1.0 atm, preferably 5.0 kPa/h or more and 18.0 kPa/h or less, and more preferably 10.0 kPa/h or more and 15.0 kPa/h or less. Here, the dissolved oxygen reduction rate refers to the rate at which the oxygen dissolved in the composition is reduced in a predetermined environment. Specifically, the dissolved oxygen reduction rate is determined by the method described in the following Examples.

It is possible to obtain excellent storage stability and discharge stability when the dissolved oxygen reduction rate is 2.0 kPa/h or more and 20.0 kPa/h or less in an environment of 25° C. and 1.0 atm. This reason for this is estimated to be as follows (however, the reason is not limited thereto). By the dissolved oxygen reduction rate being 2.0 kPa/h or more, the surface of the surface-treated metal powder included in the composition has the activity necessary for reacting with the oxygen included in the composition. That is, the surface of the metal powder is oxidized and the oxygen which is dissolved in the composition is reduced accordingly. It is presumed that, due to this, when a composition is continuously discharged using the ink jet method, the oxygen in the composition is suppressed from inhibiting the discharge and thus the discharge stability is excellent. In addition, by the dissolved oxygen reduction rate being 20.0 kPa or less, the surface of the surface-treated metal powder included in the composition has an activity of a degree such that a reaction with the water or the like included in the composition does not occur. For example, with metal powder in the related art, water is reduced on the surface thereof and hydrogen gas is generated in the composition. However, in the composition of the present embodiment, the reaction of the surface of the surface-treated metal powder with the water or the like included in the composition is suppressed. It is presumed that, due to this, the storage stability of the composition is excellent and, when the composition is continuously discharged using an ink jet method, the discharge stability is excellent due to the discharge of gas such as hydrogen gas in the composition not being inhibited.

In order to obtain an ink jet composition where the dissolved oxygen reduction rate is in the range described above, for example, the type of the surface treatment agent used in the surface treatment of the metal powder to be described below may be appropriately selected or the temperature, treatment time, or the like which are the conditions of the surface treatment of the metal powder may be appropriately set.

In the present embodiment, "non-aqueous" refers to a composition where an organic solvent, a polymerizable compound, or the like is the main solvent and water is not the main solvent, and the main solvent component is, for example, a solvent such as an organic solvent. In addition, in the preparation of the composition, a composition to which water is not intentionally added as the main solvent component is preferable, and cases where moisture is inevitably included as an impurity are also encompassed. From the point of view of storage stability, the content of water in the composition is preferably 3.0 mass % or less, more preferably 2.0 mass % or less, and even more preferably 1.0 mass % or less with respect to 100 mass % of the composition. The lower limit of the content of water is not particularly limited and may be below the detection limit, or may be 0.01 mass %. The content of the water can be quantified by a known method.

The ink jet composition of the present embodiment is preferably a solvent-based composition or a radiation-curable composition as an aspect for reducing the oxygen included in the composition. "Solvent-based" has the meaning that, in particular, an organic solvent is the main solvent in the non-aqueous composition. In addition, "radiation-curable" has the meaning that a polymerizable compound is the main solvent in the non-aqueous composition. Furthermore, the ink jet composition of the present embodiment is also preferably a non-aqueous composition where an organic solvent and a polymerizable compound are main solvents, that is, a composition which is a solvent and which is radiation-curable. The solvent-based and radiation-curable composition also preferably has water content in the range described above in the same manner as the non-aqueous composition.

The composition which includes an organic solvent of the present embodiment includes at least the surface-treated metal powder and the organic solvent to be described below. The composition which includes the solvent is roughly classified into a real solvent (a high organic solvent) composition, and an Eco-Solvent (a low organic solvent) composition. The Eco-solvent composition is a composition with a low odor which takes the human body and the environment into consideration, and uses an organic solvent which does not correspond to organic solvents stipulated by the Industrial Safety and Health Law and does not correspond to first type and second type organic solvents stipulated by Ordinance on the Prevention of Organic Solvent Poisoning, or which goes beyond the mandatory requirements for local exhaust ventilation apparatuses in indoor workplace installation environments according to the Fire Service Act. The solvent-based composition of the present embodiment preferably includes an organic solvent that may be used in such an eco-solvent composition.

The radiation-curable composition refers to an ink jet composition having a property of being cured by application of radiation energy, such as light irradiation. The radiation-curable composition according to the present embodiment includes at least the surface-treated metal powder and a polymerizable compound to be described below. The radiation-curable composition is more preferably a radical polymerization type from the point of view of coating film hardness. In order to obtain a radical polymerization type ink jet composition, a radically polymerizable compound may be used as the polymerizable compound to be described below.

The ink jet composition can be used in various applications as a composition discharged for use using an ink jet method and the applications thereof are not limited. Specific examples of applications include for inks and for polymer molding. Among these examples, applications for inks are preferable from the point of view of more effectively and reliably exhibiting the operation and effects according to the invention. More detailed description will be given below of a case where the composition of the present embodiment is used as an ink jet recording ink composition (simply referred to below as an "ink composition") which is one embodiment of an ink jet composition; however, the composition of the present embodiment is not limited thereto.

Examples of methods for adjusting the content of the water in the composition include a method for removing the water from each of the components of the composition, specifically, a method for removing water mixed in the polymerizable compound, a method for removing water mixed in the organic solvent, a method for removing water from the composition, and a method for suppressing mixing of water when preparing the composition. Among these, more specific examples of a method for removing water mixed in the polymerizable compound include a method for distilling and purifying the polymerizable compound, a method for transmitting a polymerizable compound through a semi-permeable film for selectively transmitting water, and a method for selectively adsorbing water mixed in the polymerizable compound using a water adsorbing agent which adsorbs water. Among these, a distilling and purifying method is preferable from the point of view of being able to efficiently and reliably reduce the amount of moisture.

Dispersion

The composition of the present embodiment is obtained by mixing, for example, a dispersion including a solvent and/or a polymerizable compound (a dispersion medium) and surface-treated metal powder dispersed in the solvent, and, as necessary, one type or two or more types selected from a group consisting of polymerizable compounds and organic solvents. The dispersion is not particularly limited; however, for example, by mixing the metal powder of the base particles in the organic solvent which is the solvent and the surface treatment agent at a predetermined temperature, the metal powder of the base particles is surface-treated with the surface treatment agent, and the dispersion is obtained as a liquid which include a surface-treated metal powder. In addition, a composition may be obtained by carrying out the mixing with the other materials as individual materials while not in a state in which the surface-treated metal powder is included in a dispersion. In a case where the composition is a solvent-based composition, it is preferable to use an organic solvent as a dispersion medium, and in a case where the composition is a radiation-curable composition, it is preferable to use a polymerizable compound as a dispersion medium. However, since it is also possible to remove the dispersion medium with a known method after obtaining the surface-treated metal powder, the dispersion medium is not particularly limited.

Surface-Treated Metal Powder

In the surface-treated metal powder of the present embodiment, the metal powder which is the base particles (particles subjected to surface treatment with a surface treatment agent) is surface-treated with a surface treatment agent. The base particles may be any particles as long as at least a region including the vicinity of the surface is formed of a metal material, for example, all of the particles may be formed of a metal material, or the particles may be provided with a core portion formed of a non-metal material and a coating film formed of a metal material coating the core portion.

The metal material which forms the base particles is not particularly limited as long as the metal material exhibits glossiness when attached to a medium such as a target recording medium; however, examples thereof include one type of metal selected from a group consisting of aluminum, silver, gold, platinum, nickel, chromium, tin, zinc, indium, titanium, and copper, or alloys of two or more types thereof. Among these examples, aluminum and aluminum alloys are preferable from the point of view of glossiness and raw material cost.

In addition, the base particles may be produced by any method; however, in a case where the base particles are formed of aluminum or an aluminum alloy, it is preferable that a film formed of aluminum or an aluminum alloy is formed by a vapor deposition method, and then the base particles are obtained by grinding the film. Due to this, there is a tendency to have excellent glossiness and to be able to suppress variations in the characteristics between individual particles. In addition, there is a tendency to be able to favorably produce even a comparatively thin metal powder by using the method described above as the method for manufacturing base particles.

The base particles are not particularly limited as long as the base particles are in particle shape, and may take the shape of any of spheres, spindles, needles, flakes, or the like. Among the above, flakes are preferable. That is, the surface-treated metal powder is preferably flakes in the same manner. By taking the shape of flakes, it is possible to arrange the surface-treated metal powder such that the main surface of the particles is along the surface shape of the target recording medium on the target recording medium to which an ink composition is attached, it is easy for the metal material formed of surface-treated metal powder to have an inherent glossiness, and there is a tendency to be able to achieve superior abrasion resistance in the printed matter.

In the present embodiment, the flake shape refers to a shape where the area (in plan view) when observed from a predetermined angle is larger than the area when observed from an angle perpendicular to the observation direction, such as a flat plate shape, or a curved plate shape, in particular, the ratio ($S_1/S_0$) of an area $S_1$ [$\mu m^2$] (in plan view) when observed from the direction in which the projected area is greatest and an area $S_0$ [$\mu m^2$] when observed from a direction in which the area is the greatest when observed in a direction perpendicular to the above observation direction is preferably 2.0 or more, more preferably 5.0 or more, and even more preferably 8.0 or more. The ratio ($S_1/S_0$) can be determined from the average particle diameter and the average thickness of the surface-treated metal powder to be described below.

In a case where the base particles are flakes, the average thickness of the surface-treated metal powder is preferably 0.5 nm or more and 150 nm or less, more preferably 1.0 nm or more and 100 nm or less, even more preferably 10 nm or more and 80 nm or less, and yet more preferably 20 nm or more and 60 nm or less. Due to this, the effects due to the base particles being flakes are more remarkably exhibited.

The average particle diameter of the surface-treated metal powder is preferably 0.1 µm or more and 3.0 µm or less, more preferably 0.2 µm or more and 3.0 µm or less, even more preferably 0.3 µm or more and 3.0 µm or less, and yet more preferably 0.5 µm or more and 3.0 µm or less. By the average particle diameter being 3.0 µm or less, there is a tendency to be able to obtain a superior glossiness in the recorded matter produced using the ink composition. In addition, there is a tendency to be able to obtain a superior storage stability and discharge stability in the composition. On the other hand, by the average particle diameter being 0.1 µm or more, there is a tendency to easily obtain a glossiness in the recorded matter. Here, the average particle diameter is determined on a volume basis.

It is possible to determine the average thickness of the surface-treated metal powder as the number average of the thickness of 70 particles of the surface-treated metal powder using a transmission electron microscope (TEM, product name "CM200" manufactured by FEI Company). In addition, it is possible to determine the average particle diameter of the surface-treated metal powder from the measurement results using a light scattering method (product name "Microtrac MT-3000" manufactured by MicrotracBEL Corp.). Here, the average thickness is determined on a volume basis.

In addition, the maximum particle diameter of the surface-treated metal powder is preferably 5.0 µm or less, more preferably 4.5 µm or less, and even more preferably 4.0 µm or less. Due to this, there is a tendency to be able to obtain a superior storage stability and discharge stability in the composition. Here, the lower limit of the maximum particle diameter of the metal powder is not particularly limited and, for example, may be 1.0 µm.

The average thickness of the surface-treated metal powder is preferably 1.0 nm or more and 100 nm or less and the average particle diameter of the surface-treated metal powder is preferably 0.1 µm or more and 3.0 µm or less. Due to this, the effect due to the surface-treated metal powder being flakes and the balance between the glossiness of the recorded matter, the storage stability and discharge stability of the composition are more favorable.

Here, in order to set the average thickness, the average particle diameter, and the maximum particle diameter of the surface-treated metal powder to each of the ranges described above, a surface-treated metal powder where the average thickness, the average particle diameter, and the maximum particle diameter of the base particles which are the raw material thereof are in the same ranges may be used.

The content of the base particles in the dispersion is preferably 0.5 mass % or more and 100 mass % or less, more preferably 1.5 mass % or more and 50 mass % or less, and even more preferably 3.0 mass % or more and 10 mass % or less with respect to the mass (100 mass %) of the solvent in the dispersion. By setting the content of the base particles in these ranges, the dispersibility of the base particles is further improved, and it is even easier to set the surface-treated metal powder included in the finally obtained ink composition to a desired content or more.

The content of the surface-treated metal powder in the composition is preferably 0.1 mass % or more and 40 mass % or less, more preferably 0.5 mass % or more and 10.0 mass % or less, and even more preferably 1.0 mass % or more and 3.0 mass % or less. By setting the content of the surface-treated metal powder to these ranges, it is possible to further improve the balance between the glossiness of the recorded matter and the storage stability and the discharge stability of the composition.

The surface-treated metal powder preferably includes an aluminum or aluminum alloy where a part of the surface of the metal powder is exposed. That is, even when using particles formed of aluminum or an aluminum alloy as base particles for the surface-treated metal powder and carrying out a surface treatment using the surface treatment agent to be described below, the surface treatment agent preferably modifies a portion other than the part described above of the surface of the base particles without modifying the whole of the surface of the base particles. Due to this, it is presumed that, for example, the surface-treated metal powder has superior storage stability and discharge stability due to the metal being exposed on the surface to an extent that the oxygen included in the composition is reduced (however, the factors are not limited thereto). It is possible to confirm that a part of the surface of the metal powder is exposed by measuring the modification amount of the surface-treated metal powder using the nuclear magnetic resonance method (1H-NMR). Specifically, the surface treatment is carried out with an excessive amount of the surface treatment agent and the surface-treated metal powder is prepared on the entire surface of the base particles. Next, each of a surface-treated metal powder of a sample and the prepared surface-treated metal powder is cleaned to remove the unmodified surface treatment agent, and each of the modification amounts is measured. In a case where the modification amount of the surface-treated metal powder on the entire surface is set as 100%, the modification amount of the surface-treated metal powder of the sample is calculated, and in a case where the value thereof is 90% or less, a part of the surface of the metal powder is exposed.

Solvent (Dispersion Medium)

The solvent (dispersion medium) in the dispersion is not particularly limited as long as it is possible to disperse the surface-treated metal powder. From the point of view of further improving the dispersion of the surface-treated metal powder, the solvent (dispersion medium) is preferably a solvent exemplified as an organic solvent included in the composition to be described below, and, among these solvents, preferably the same as the organic solvents which are preferable in the composition. The organic solvent which is contained in the dispersion and the organic solvent which is contained in a composition which is separate therefrom may be the same organic solvents or may be different organic solvents. In addition, in a case where the composition is a radiation-curable composition, the solvent is preferably a solvent exemplified as a polymerizable compound contained in the composition to be described below, and, among these solvents, preferably the same as the polymerizable compounds which are preferable in the composition. The polymerizable compound contained in the dispersion and the polymerizable compound contained in a composition which is separate therefrom may be the same polymerizable compound, or may be different polymerizable compounds.

Surface Treatment Agent

The surface treatment agent of the present embodiment is not particularly limited as long as the surface treatment agent modifies the surface of the base particles and is able to suppress oxidation of the surface thereof, and, for example, it is possible to widely use fluorine-based, fatty acid-based, oil-based, surfactant-based, wax-based, carboxylic acid-based, phosphoric acid-based, coupling agent, and polymer-based surface treatment agents. Among the above, the surface treatment agent is preferably one type or two or more types of surface treatment agent selected from a group consisting of fluorine-containing phosphoric acid esters, silanol-modified silicone, fluorine-containing silane compounds, and alkyl phosphoric acid esters, more preferably, from the point of view of storage stability, one type or two or more types selected from a group consisting of fluorine-containing phosphoric acid esters, fluorine-containing silane compounds, and alkyl phosphoric acid esters, even more preferably one type or two or more types selected from a group consisting of fluorine-containing phosphoric acid esters, and fluorine-containing silane compounds, and yet more preferably fluorine-containing phosphoric acid esters.

The fluorine-based surface treatment agent is a compound which has at least one fluorine atom in the molecule, and it is possible to use a compound where it is possible to introduce a fluorine atom to the base particles. The fluorine-based surface treatment agent is not particularly limited and examples thereof include a fluorine-containing silane compound, a fluorine-containing phosphoric acid ester, a fluorine-containing fatty acid or an ester thereof, and a fluorine-containing isocyanate compound.

The fluorine-containing silane compound is not particularly limited; however, specific examples thereof include dimethyldimethoxysilane, diethyldiethoxysilane, 1-propenyl methyl dichlorosilane, propyl dimethyl chlorosilane, propyl methyl dichlorosilane, propyl trichlorosilane, propyl triethoxysilane, propyl trimethoxysilane, styrylethyltrimethoxysilane, tetradecyl trichlorosilane, 3-thiocyanate propyl triethoxysilane, p-tolyl dimethyl chlorosilane, p-tolyl methyl dichlorosilane, p-tolyl trichlorosilane, p-tolyl trimethoxysilane, p-tolyl triethoxysilane, di-n-propyl di-n-propoxysilane, diisopropyl diisopropoxysilane, di-n-butyl di-n-butyloxysilane, di-sec-butyl di-sec-butyloxysilane, di-t-butyl di-t-butyloxysilane, octadecyl trichlorosilane, octadecyl methyldiethoxysilane, octadecyl triethoxysilane, octadecyl trimethoxysilane, octadecyl dimethyl chlorosilane, octadecyl methyl dichlorosilane, octadecyl methoxy dichlorosilane, 7-octenyl dimethyl chlorosilane, 7-octenyl trichlorosilane, 7-octenyl trimethoxysilane, octyl methyl dichlorosilane, octyl dimethyl chlorosilane, octyl trichlorosilane, 10-undecenyl dimethyl chlorosilane, undecyl trichlorosilane, vinyl dimethyl chlorosilane, methyl dodecyl dimethoxysilane, methyl dodecyl diethoxysilane, methyl octadecyl dimethoxysilane, methyl octadecyl diethoxysilane, n-octyl methyl dimethoxysilane, n-octyl methyldiethoxysilane, triacontyl dimethyl chlorosilane, triacontyl trichlorosilane, methyl trimethoxysilane, methyl triethoxysilane, methyl tri-n-propoxysilane, methyl triisopropoxysilane, methyl tri-n-butyloxysilane, methyl tri-sec-butyloxysilane, methyl tri-t-butyloxysilane, ethyl trimethoxysilane, ethyl triethoxysilane, ethyl tri-n-propoxysilane, ethyl triisopropoxysilane, ethyl-n-butyloxysilane, ethyltri-sec-butyloxysilane, ethyltri-t-butyloxysilane, n-propyl trimethoxysilane, isobutyl trimethoxysilane, n-hexyl trimethoxysilane, hexadecyltrimethoxysilane, n-octyl trimethoxysilane, n-dodecyl triethoxysilane, n-octadecyl trimethoxysilane, n-propyl triethoxysilane, isobutyl triethoxysilane, n-hexyl triethoxysilane, hexadecyl triethoxysilane, n-octyltriethoxysilane, n-dodecyl trimethoxysilane, n-octadecyltriethoxysilane, 2-[2-(trichlorosilyl) ethyl] pyridine, 4-[2-(trichlorosilyl) ethyl] pyridine, diphenyldimethoxysilane, diphenyldiethoxysilane, 1,3-(trichlorosilylmethyl) heptacosane, dibenzyl dimethoxysilane, dibenzyl diethoxysilane, phenyl trimethoxysilane, phenyl trimethyl dimethoxysilane, phenyl dimethyl methoxysilane, phenyl dimethoxysilane, phenyl diethoxysilane, phenyl methyl diethoxysilane, phenyl dimethylethoxysilane, benzyl triethoxysilane, benzyl trimethoxysilane, benzyl methyl dimethoxysilane, benzyl dimethyl methoxysilane, benzyl dimethoxysilane, benzyl diethoxysilane, benzyl methyldiethoxysilane, benzyl dimethyl ethoxysilane, benzyl triethoxysilane, dibenzyl dimethoxysilane, dibenzyl diethoxysilane, 3-acetoxypropyl trimethoxysilane, 3-acryloxypropyl trimethoxysilane, allyl trimethoxysilane, allyl triethoxysilane, 4-aminobutyl triethoxysilane, (amino ethyl amino methyl) phenethyl trimethoxysilane, N-(2-aminoethyl)-3-aminopropyl methyl dimethoxysilane, N-(2-aminoethyl)-3-aminopropyl trimethoxysilane, 6-(amino hexyl amino propyl) trimethoxysilane, p-aminophenyl trimethoxysilane, p-aminophenyl ethoxysilane, m-aminophenyl trimethoxysilane, m-aminophenyl ethoxysilane, 3-aminopropyl trimethoxysilane, 3-aminopropyl triethoxysilane, ω-amino undecyl trimethoxysilane, amyl triethoxysilane, benzooxasilepin dimethyl ester, 5-(bicycloheptenyl) triethoxysilane, bis(2-hydroxyethyl)-3-aminopropyl triethoxysilane, 8-bromooctyl trimethoxysilane, bromophenyl trimethoxysilane, 3-bromopropyl trimethoxysilane, n-butyl trimethoxysilane, 2-chloro-ethyl triethoxysilane, chloromethyl methyl diethoxysilane, chloromethyl methyl diisopropoxysilane, p-(chloromethyl) phenyl trimethoxysilane, chloromethyl triethoxysilane, chlorophenyl triethoxysilane, 3-chloropropylmethyldimethoxysilane, 3-chloropropyl triethoxysilane, 3-chloropropyl trimethoxysilane, 2-(4-chlorosulfonyl phenyl) ethyl trimethoxysilane, 2-cyanoethyl triethoxysilane, 2-cyanoethyl trimethoxysilane, cyanomethyl phenethyl triethoxysilane, 3-cyanopropyl triethoxysilane, 2-(3-cyclohexenyl) ethyl trimethoxysilane, 2-(3-cyclohexenyl) ethyl triethoxysilane, 3-cyclohexenyl trichlorosilane, 2-(3-cyclohexenyl) ethyl trichlorosilane, 2-(3-cyclohexenyl) ethyl dimethyl chlorosilane, 2-(3-cyclohexenyl) ethyl methyl dichlorosilane, cyclohexyl dimethyl chlorosilane, cyclohexyl ethyldimethoxysilane, cyclohexyl methyl dichlorosilane, cyclohexyl methyldimethoxysilane, (cyclohexyl methyl) trichlorosilane, cyclohexyl trichlorosilane, cyclohexyl trimethoxysilane, cyclooctyl trichlorosilane, (4-cyclooctenyl) trichlorosilane, cyclopentyl trichlorosilane, cyclopentyl trimethoxysilane, 1,1-diethoxy-1-silacyclopentan-3-ene, 3-(2,4-dinitrophenylamino) propyl triethoxysilane, (dimethyl chlorosilyl) methyl-7,7-dimethyl norpinane, (cyclohexyl aminomethyl) methyl diethoxysilane, (3-cyclopentadienylpropyl) triethoxysilane, N,N-diethyl-3-aminopropyl trimethoxysilane, 2-(3,4-epoxycyclohexyl) ethyl trimethoxysilane, 2-(3,4-epoxycyclohexyl) ethyl triethoxysilane, (furfuryl oxymethyl) triethoxysilane, 2-hydroxy-4-(3-ethoxy propoxy) diphenyl ketone, 3-(p-methoxyphenyl) propyl methyl dichlorosilane, 3-(p-methoxyphenyl) propyl trichlorosilane, p-(methylphenethyl) methyl dichlorosilane, p-(methylphenethyl) trichlorosilane, p-(methylphenethyl) dimethyl chlorosilane, 3-morpholinopropyl trimethoxysilane, (3-glycidoxypropyl) methyldiethoxysilane, 3-glycidoxypropyl trimethoxysilane, 1,2,3,4,7,7,-hexachloro-6-methyl diethoxysilyl-2-norbornene, 1,2,3,4,7,7,-hexachloro-6-triethoxysilyl-2-norbornene, 3-iodopropyl trimethoxysilane, 3-isocyanate propyl triethoxysilane, (mercaptomethyl) methyldiethoxysilane, 3-mercaptopropyl methyldimethoxysilane, 3-mercaptopropyl dimethoxysilane, 3-mercaptopropyl triethoxysilane, 3-methacryloxypropyl methyl diethoxysilane, 3-methacryloxypropyl trimethoxysilane, methyl{2-(3-trimethoxysilylpropylamimno) ethylamino}-3-propionate, 7-octenyl trimethoxysilane, R—N-α-phenethyl-N'-triethoxysilylpropyl urea, S—N-α-phenethyl-N'-triethoxysilylpropyl urea, phenethyl trimethoxysilane, phenethyl methyldimethoxysilane, phenethyl dimethyl methoxysilane, phenethyl dimethoxysilane, phenethyl diethoxysilane, phenethyl methyldiethoxysilane, phenethyl dimethylethoxysilane, phenethyl triethoxysilane, (3-phenylpropyl) dimethyl chlorosilane, (3-phenylpropyl) methyl dichlorosilane, N-phenylaminopropyl trimethoxysilane, N-(triethoxysilylpropyl) dansylamide, N-(3-triethoxysilylpropyl)-4,5-dihydroimidazole, 2-(triethoxysilylethyl)-5-(chloroacetoxy) bicycloheptane, (S)—N-triethoxysilylpropyl-O-menthocarbamate, 3-(triethoxysilylpropyl)-p-nitrobenzamide, 3-(triethoxysilyl) propyl succinic anhydride, N-[5-(trimethoxysilyl)-2-aza-1-oxo-pentyl] caprolactam, 2-(trimethoxysilylethyl) pyridine, N-(trimethoxysilylethyl) benzyl-N,N,N-trimethylammonium chloride, phenyl vinyl diethoxysilane, 3-thiocyanate propyl triethoxysilane, and N-{3-(triethoxysilyl) propyl}phthalamide acid.

In addition, other specific examples include 1-trimethoxysilyl-2-(chloromethyl) phenylethane, 2-(trimethoxysilyl) ethyl phenyl sulfonyl azide, β-trimethoxysilylethyl-2-pyridine, trimethoxysilylpropyl diethylenetriamine, N-(3-trimethoxysilylpropyl) pyrrole, N-trimethoxysilylpropyl-N,N,N-tributyl ammonium bromide, N-trimethoxysilylpropyl-N,N,N-tributylammonium chloride, N-trimethoxysilylpropyl-N,N,N-trimethyl ammonium chloride, vinyl methyl diethoxysilane, vinyl triethoxysilane, vinyl trimethoxysilane, vinyl methyl dimethoxysilane, vinyl dimethyl methoxysilane, vinyl dimethyl ethoxysilane, vinyl methyl dichlorosilane, vinyl phenyl dichlorosilane, vinyl phenyl diethoxysilane, vinyl phenyl dimethyl silane, vinyl phenyl methyl chlorosilane, vinyl triphenoxysilane, vinyl tris-t-butoxysilane, adamantylethyl trichlorosilane, allyl phenyl trichlorosilane, (amino ethyl amino methyl) phenethyltrimethoxysilane, 3-aminophenoxy dimethyl vinylsilane, phenyl trichlorosilane, phenyl dimethyl chlorosilane, phenyl methyl dichlorosilane, benzyl trichlorosilane, benzyl dimethyl chlorosilane, benzyl methyl dichlorosilane, phenethyl diisopropylchlorosilane, phenethyl trichlorosilane, phenethyl dimethyl chlorosilane, phenethyl methyl dichlorosilane, 5-(bicycloheptenyl) trichlorosilane, 5-(bicycloheptenyl) triethoxysilane, 2-(bicycloheptyl) dimethyl chlorosilane, 2-(bicycloheptyl) trichlorosilane, 1,4-bis (trimethoxysilylethyl) benzene, bromophenyl trichlorosilane, 3-phenoxypropyl dimethyl chlorosilane, 3-phenoxy propyl trichlorosilane, t-butyl phenyl chlorosilane, t-butyl phenyl methoxysilane, t-butyl phenyl dichlorosilane, p-(t-butyl) phenethyl dimethyl chlorosilane, p-(t-butyl) phenethyl trichlorosilane, 1,3-(chlorodimethylsilylmethyl) heptacosane, ((chloromethyl) phenylethyl) dimethyl chlorosilane, ((chloromethyl) phenylethyl) methyl dichlorosilane, ((chloromethyl) phenylethyl) trichlorosilane, ((chloromethyl) phenylethyl) trimethoxysilane, chlorophenyl trichlorosilane, 2-cyanoethyl trichlorosilane, 2-cyanoethylmethyl dichlorosilane, 3-cyanopropyl methyl diethoxysilane, 3-cyanopropyl methyl dichlorosilane, 3-cyanopropyl methyl dichlorosilane, 3-cyanopropyl dimethyl ethoxysilane, 3-cyanopropyl methyl dichlorosilane, and 3-cyanopropyl trichlorosilane.

In addition, a fluorine-based surface treatment agent, for example, a fluorine-containing silane compound, preferably has a perfluoroalkyl structure ($C_nF_{2n+1}$). Due to this, there is a tendency for the storage stability of the composition to be superior and for the glossy feel and the abrasion resistance of the printed portion of the recorded matter produced by using the radiation-curable composition to be superior.

The fluorine-containing silane compound which has a perfluoroalkyl structure is not particularly limited; however, examples thereof include $CF_3$—$CH_2CH_2$—$Si(OCH_3)_3$, $CF_3$ $(CF_2)_3$—$CH_2CH_2$—$Si(OCH_3)_3$, $CF_3$ $(CF_2)_5$—$CH_2CH_2$—$Si$ $(OCH_3)_3$, $CF_3(CF_2)_5$—$CH_2CH_2$—$Si(OC_2H_5)_3$, $CF_3$ $(CF_2)_7$—$CH_2CH_2$—$Si(OCH_3)_3$, $CF_3(CF_2)_{11}$—$CH_2CH_2$—$Si$ $(OC_2H_5)_3$, $CF_3$ $(CF_2)_3$—$CH_2CH_2$—$Si(CH_3)$ $(OCH_3)_2$, $CF_3$ $(CF_2)_7$—$CH_2CH_2$—$Si(CH_3)$ $(OCH_3)_2$, $CF_3$ $(CF_2)_8$—$CH_2CH_2$—$Si$ $(CH_3)$ $(OC_2H_5)_2$, and $CF_3$ $(CF_2)_8$—$CH_2CH_2$—$Si(C_2H_5)$ $(OC_2H_5)_2$.

In addition, as a fluorine-containing silane compound, it is also possible to use compounds having a perfluoroalkyl ether structure ($C_nF_{2n+1}O$) in place of the perfluoroalkyl structure described above. The fluorine-containing silane compound which has a perfluoroalkyl ether structure is not particularly limited; however, examples thereof include $CF_3O(CF_2O)_6$—$CH_2CH_2$—$Si(OC_2H_5)_3$, $CF_3O$ $(C_3F_6O)_4$—$CH_2CH_2$—$Si(OCH_3)_3$, $CF_3O(C_3F_6O)_2(CF_2O)_3$—$CH_2CH_2$—$Si(OCH_3)_3$, $CF_3O$ $(C_3F_6O)_8$—$CH_2CH_2$—$Si(OCH_3)_3$, $CF_3O$ $(C_4F_9O)_5$—$CH_2CH_2$—, $Si(OCH_3)_3$, $CF_3O$ $(C_4F_9O)_5$—$CH_2CH_2$—$Si(CH_3)$ $(OC_2H_5)_2$, and $CF_3O$ $(C_3F_6O)_4$—$CH_2CH_2$—$Si(C_2H_5)$ $(OCH_3)_2$.

The fluorine-containing phosphoric acid ester is a phosphoric acid ester having at least one fluorine atom in the molecule. In particular, the fluorine-containing phosphoric acid ester is preferably the compound which is represented by the following Formula (3).

$$POR_n(OH)_{3-n} \quad (3)$$

Here, in Formula (3), R is $CF_3(CF_2)_m$—, $CF_3(CF_2)_m(CH_2)_1$—, $CF_3(CF_2)_m(CH_2O)_1$—, $CF_3(CF_2)_m(CH_2CH_2O)_1$—, $CF_3(CF_2)_mO$—, or $CF_3(CF_2)_m(CH_2)_1O$—, n is an integer of 1 to 3, m is an integer of 2 to 18, and 1 is an integer of 1 to 18.

Due to this, there is a tendency for the storage stability of the composition to be superior, and for the glossy feel and the abrasion resistance of the printed portion of the recorded matter produced using the composition to be particularly excellent. In Formula (3), m is preferably an integer of 3 to 14, and more preferably an integer of 4 to 12. Due to this, the effects described above are more remarkably exhibited. In addition, in Formula (3), 1 is preferably an integer of 1 to 14, and more preferably an integer of 1 to 10. Due to this, there is a tendency for effects described above to be more remarkably exhibited.

Examples of the fluorine-containing fatty acid include $CF_3$—$CH_2CH_2$—$COOH$, $CF_3(CF_2)_3$—$CH_2CH_2$—$COOH$, $CF_3(CF_2)_5$—$CH_2CH_2$—$COOH$, $CF_3(CF_2)_6$—$CH_2CH_2$—$COOH$, $CF_3(CF_2)_7$—$CH_2CH_2$—$COOH$, and $CF_3(CF_2)_9$—$CH_2CH_2$—$COOH$, and esters thereof. Among these, $CF_3$ $(CF_2)_5$—$CH_2CH_2$—$COOH$ is preferable. Due to this, it is possible to effectively reduce the surface energy of the particles since it is possible to form a strong bond with the metal atoms such as aluminum and titanium which form the base particles through a dehydration reaction by heating and to form a dense film.

As the fluorine-containing isocyanate compound, it is possible to use a compound which has a chemical structure which is represented by the following Formula (2).

$$RfNCO \quad (2)$$

Here, in Formula (2), Rf is $CF_3(CF_2)_m$— or $CF_3(CF_2)_m(CH_2)_1$—, m is an integer of 2 to 18, and 1 is an integer of 1 to 18.

Due to this, it is possible for the storage stability of the composition to be particularly excellent. In addition, in the recorded matter produced using the composition, it is possible to more favorably set the surface-treated metal powder in an array (leafing) in the vicinity of the outer surface of the printing portion, and the glossy feel of the printing portion of the produced recorded matter is particularly excellent. In addition, it is possible for the abrasion resistance of the printed portion of the produced recorded matter to be particularly excellent.

In Formula (2), m is preferably an integer of 3 to 14, and more preferably an integer of 4 to 12. Due to this, the effects described above are more remarkably exhibited. In addition, in Formula (2), 1 is preferably an integer of 1 to 14, and more preferably an integer of 1 to 10. Due to this, the effects described above are more remarkably exhibited.

The silicone-based surface treatment agent is not particularly limited; however, examples thereof include silanol-modified silicone and the like, and examples of commercially available products include "X-21-5841", trade name produced by Shin-Etsu Chemical Co., Ltd., and "BY-16-873", trade name produced by Dow Corning Corp. (both are dual-terminal silanol dimethyl silicone oil).

The alkyl-based surface treatment agent is not particularly limited; however, examples thereof include alkyl phosphoric acid esters, and examples of commercially available products include "PHOSPHANOL ML-200", trade name produced by TOHO Chemical Industry Co., Ltd. (alkyl phosphoric acid ester).

Examples of other surface treatment agents include silane compounds (however, excluding fluorine-containing silane compounds), fatty acids (however, excluding fluorine-containing fatty acids), and isocyanate compounds (however, excluding fluorine-containing isocyanate).

Examples of the conditions for surface treating the metal powder which is the base particles with a surface treatment agent include temperature and time. The temperature of the surface treatment is preferably 20° C. or higher and 100° C. or lower, more preferably 30° C. or higher and 80° C. or lower, and even more preferably 40° C. or higher and 60° C. or lower. The time of the surface treatment is preferably 1.0 minute or longer and 1 week or shorter, more preferably 1.0 hour or longer and 3 days or shorter, and even more preferably 10 hours or longer and 1.5 days or shorter. Due to this, there is a tendency for the dissolved oxygen reduction rate to be more easily set to the desired numerical value.

The content of the surface treatment agent in the dispersion is preferably 0.5 mass % or more and less than 20 mass %, more preferably 1.5 mass % or more and less than 10 mass %, and even more preferably 3.0 mass % or more and 8.0 mass % or less with respect to the mass (100 mass %) of the base particles. By the content of the surface treatment agent being 0.5 mass % or more, there is a tendency for the storage stability to be superior and by the content of the surface treatment agent being 3.0 mass % or more, there is a tendency for the storage stability to be superior. In addition, by the content of the surface treatment agent being less than 20 mass %, there is a tendency for the discharge stability to be superior and by the content of the surface treatment agent being less than 8.0 mass %, there is a tendency for the discharge stability to be superior.

In addition, a plurality of types of surface treatment agents may be used in combination. In such a case, the surface treatment may be carried out on the same base particles with a plurality of types of surface treatment agents, or the surface-treated metal powder may include a plurality of types of particles on which surface treatments are carried out with different surface treatment agents.

The base particles subjected to surface treatment with the surface treatment agent as described above are preferably brought into contact with an acid or a base in advance. Due to this, it is possible to more reliably perform modification using the chemical bond according to the surface treatment agent on the base particle surface, and there is a tendency to be able to more effectively exhibit the effects according to the invention described above. The acid is not particularly limited; however, examples thereof include proton acids such as hydrochloric acid, sulfuric acid, phosphoric acid, nitric acid, acetic acid, carbonate, formic acid, benzoic acid, chlorous acid, hypochlorous acid, sulfite, hyposulfite, nitrous acid, hypochlorous acid, phosphorous acid, and hypophosphorous acid. Among these, one type or two or more types which are selected from a group consisting of hydrochloric acid, phosphoric acid, and acetic acid is preferable. On the other hand, the base is not particularly limited; however, examples thereof include sodium hydroxide, potassium hydroxide, and calcium hydroxide. Among these, one type or two or more types selected from a group consisting of sodium hydroxide, and potassium hydroxide are suitable. In a case of carrying out a plurality of types of surface treatment on the same particles, the surface treatment may be performed in a plurality of steps corresponding to each surface treatment agent, and the surface treatment may be performed with a plurality of types of the surface treatment agent in the same step.

Organic Solvent

The organic solvents which may be included in the composition of the present embodiment are not particularly limited; however, examples thereof include glycol monoether, glycol diether, and lactone, and these may be used alone or in a combination of two or more types.

The glycol monoether is not particularly limited; however, examples thereof include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether. Among the above, preferable examples include diethylene glycol monomethyl ether, dipropylene glycol monomethyl ether, triethylene glycol monobutyl ether, tripropylene glycol monomethyl ether, and tetraethylene glycol monobutyl ether. By containing the glycol monoether, there is a tendency for the concealing property of the obtained recorded matter to be further improved. The glycol monoether may be used alone, or may be used in a combination of two or more types.

The glycol diether is not particularly limited; however, examples thereof include ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether. Among the above, diethylene glycol methyl ethyl ether and diethylene glycol diethyl ether are preferable. By containing such a glycol diether, there is a tendency for the balance between the storage stability and the concealing property of the obtained recorded matter to be further improved. The glycol diethers may be used alone, or may be used in a combination of two or more types.

The lactone is not particularly limited; however, examples thereof include a compound which has a cyclic structure using ester bonds, γ-lactone with a 5-membered ring structure, δ-lactone with a 6-membered ring structure, and ε-lactone with a 7-membered ring structure. More specifically, examples thereof include γ-butyrolactone, γ-valerolactone, γ-hexalactone, γ-heptalactone, γ-octalactone, γ-nonalactone, γ-decalactone, γ-undecalactone, δ-valerolactone, δ-hexalactone, δ-heptalactone, δ-octalactone, δ-nonalactone, δ-decalactone, δ-undecalactone, and ε-caprolactam. Among the above, γ-lactone with a 5-membered ring structure is preferable, and γ-butyrolactone and γ-valerolactone are more preferable. By containing such lactones, there is a tendency for the abrasion resistance to be further improved. The lactones may be used alone, or may be used in a combination of two or more types.

In a case where the composition is a solvent-type composition, the content of the organic solvent is preferably 35 mass % or more and 99.5 mass % or less, more preferably 45 mass % or more and 99.0 mass % or less, and even more preferably 60 mass % or more and 98.5 mass % or less with respect to the total amount (100 mass %) of the composition. Here, the content of the organic solvent in the composition also includes the content of the organic solvent used in the dispersion.

Polymerizable Compound

It is possible for the polymerizable compounds which may be included in the composition of the present embodiment to cure the composition on the target recording medium by polmerization by the application of radiation energy such as light irradiation using the compound alone or through the effect of a polymerization initiator.

Specific examples of polymerizable compounds include monomers and oligomers which are monofunctional, or multi-functional such as bifunctional, or trifunctional or higher. The polymerizable compound may be used alone, or may be used in a combination of two or more types. Specific examples of monomers which are polymerizable compounds include unsaturated carboxylic acid such as (meth) acrylic acid, itaconic acid, crotonic acid, isocrotonic acid, and maleic acid; salts of the unsaturated carboxylic acids; esters, urethanes, amides, and anhydrides of unsaturated carboxylic acids; acrylonitrile, styrene, various unsaturated polyesters, unsaturated polyethers, unsaturated polyamides, and unsaturated urethanes. From the point of view of further improving the curability of the composition and from the point of view of obtaining high versatility and high convenience, the polymerizable compound more preferably includes a radical polymerizable compound.

Specific examples of oligomers which are monofunctional, or multi-functional such as bifunctional, or trifunctional or higher include oligomers formed from the monomers described above such as straight-chain acrylic oligomers, epoxy (meth)acrylate, oxetane (meth)acrylate, aliphatic urethane (meth)acrylate, aromatic urethane (meth) acrylate, and polyester (meth)acrylate.

In addition, as other monofunctional monomers or multi-functional monomers, an N-vinyl compound may be included. Specific examples of N-vinyl compounds include N-vinyl formamide, N-vinyl carbazole, N-vinyl acetamide, N-vinyl pyrrolidone, N-vinyl caprolactam, and acryloylmorpholine, and derivatives thereof.

The composition may include monofunctional (meth)acrylate as a monofunctional monomer. In such a case, the composition has a lower viscosity, the solubility of the photopolymerization initiator and other additives is excellent, and it is easy to obtain discharge stability during ink jet recording. Specific examples of monofunctional (meth)acrylate include isoamyl (meth)acrylate, stearyl (meth)acrylate, lauryl (meth)acrylate, octyl (meth)acrylate, decyl (meth) acrylate, isomyristyl (meth)acrylate, isostearyl (meth)acrylate, 2-ethylhexyl-diglycol (meth)acrylate, 2-hydroxybutyl (meth)acrylate, 4-hydroxybutyl (meth)acrylate, butoxyethyl (meth)acrylate, ethoxy diethylene glycol (meth)acrylate, methoxy diethylene glycol (meth)acrylate, methoxy polyethylene glycol (meth)acrylate, methoxy propylene glycol (meth)acrylate, benzyl acrylate, phenoxyethyl (meth)acrylate, tetrahydrofurfuryl (meth)acrylate, isobornyl (meth) acrylate, 2-hydroxyethyl (meth)acrylate, 2-hydroxypropyl (meth)acrylate, 2-hydroxy-3-phenoxypropyl (meth)acrylate, lactone-modified flexible (meth)acrylate, t-butyl cyclohexyl (meth)acrylate, dicyclopentanyl (meth)acrylate, dicyclopentenyloxyethyl (meth)acrylate, 2-(isopropenoxy ethoxy) ethyl (meth)acrylate, 2-(isopropenoxy ethoxyethoxy) ethyl (meth)acrylate, 2-(isopropenoxy ethoxyethoxyethoxy) ethyl (meth)acrylate, 2-(isopropenoxy ethoxyethoxy ethoxyethoxy) ethyl (meth)acrylate, polyethylene glycol monovinyl ether (meth)acrylate, and polypropylene glycol monovinyl ether (meth)acrylate.

The composition may also include multi-functional (meth)acrylate as a multi-functional monomer. Among the above, specific examples of bifunctional (meth)acrylate include triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane (meth)acrylate, EO (ethylene oxide) adduct di(meth)acrylate of bisphenol A, PO (propylene oxide) adduct di(meth) acrylate of bisphenol A, hydroxypivalic acid neopentyl glycol di(meth)acrylate, polytetramethylene glycol di(meth) acrylate, diethylene glycol di(meth)acrylate, and triethylene glycol di(meth)acrylate.

In addition, specific examples of the trifunctional or higher (meth)acrylate include trimethylolpropane tri(meth) acrylate, EO-modified trimethylolpropane tri(meth)acrylate, pentaerythritol tri(meth)acrylate, pentaerythritol tetra(meth) acrylate, dipentaerythritol hexa (meth)acrylate, ditrimethylolpropane tetra(meth)acrylate, glycerin propoxyphene tri (meth)acrylate, caprolactone-modified trimethylolpropane tri(meth)acrylate, pentaerythritol ethoxy tetra(meth)acrylate, and caprolactam-modified dipentaerythritol hexa (meth)acrylate.

Among the above, one type or more selected from a group consisting of dipropylene glycol di(meth)acrylate, tripropylene glycol di(meth)acrylate, diethylene glycol di(meth)acrylate, triethylene glycol di(meth)acrylate, and pentaerythritol tri(meth)acrylate are preferable, and one type or more selected from a group consisting of dipropylene glycol di(meth)acrylate, and pentaerythritol tri(meth)acrylate are more preferable.

In addition, from the point of view of improving the toughness, the heat resistance, and the chemical resistance of the cured composition, a monofunctional (meth)acrylate and a bifunctional (meth)acrylate are also preferably used together, and, among these, phenoxyethyl (meth)acrylate and dipropylene glycol di(meth)acrylate are more preferably used together.

In a case where the composition is a radiation-curable composition, the content of the polymerizable compound in the composition is preferably 20 mass % or more and 95 mass % or less, more preferably 30 mass % or more and 90 mass % or less, and even more preferably 45 mass % or more and 65 mass % or less with respect to the total amount (100% mass %) of the composition. By setting the content of the polymerizable compound in the ranges described above, it is possible to further reduce the viscosity and odor, and it is possible to have superior solubility in a case of using the photopolymerization initiator and superior reactivity, and superior glossiness of the printed matter.

Polymerization Initiator

The composition of the present embodiment may also include a polymerization initiator. As long as the polymerization initiator generates an active species such as radical, cation, or anion using radiation energy such as ultraviolet light and electron beams, and initiates the polymerization of the polymerizable compound described above, the polymerization initiator is not limited. Among the above, a photopolymerization initiator is preferable, and a photo-radical polymerization initiator is more preferable. The photo-radical polymerization initiator is more preferably one type or two or more types selected from a group consisting of acylphosphine oxide-based photopolymerization initiators, and thioxanthone-based photopolymerization initiators, and even more preferably acylphosphine oxide-based photopolymerization initiators.

Acylphosphine oxide-based photopolymerization initiators are susceptible to oxygen inhibition but are suitable for curing with a long-wavelength light LED. In addition, it is possible for acylphosphine oxide-based photopolymerization initiators to be more efficiently dissolved in the composition by setting the water content in the composition to be 1.0 mass % or less with respect to the total amount of the composition.

Specific examples of acylphosphine oxide-based photopolymerization initiators include bis(2,4,6-trimethylbenzoyl)-phenylphosphine oxide, 2,4,6-trimethyl benzoyl-diphenyl-phosphine oxide, and bis-(2,6-dimethoxybenzoyl)-2,4,4-trimethyl pentyl phosphine oxide. Commercially available products of the acylphosphine oxide-based photopolymerization initiator specifically include IRGACURE 819 (trade name, produced by BASF Corp., bis(2,4,6-trimethylbenzoyl)-phenylphosphine oxide), SPEEDCURE TPO (trade name, produced by Lambson Ltd., 2,4,6-trimethyl benzoyl-diphenyl-phosphine oxide), and DAROCUR TPO (trade name, produced by BASF Corp., 2,4,6-trimethyl benzoyl-diphenyl-phosphine oxide), SPEEDCURE TPO-L (trade name, produced by Lambson Ltd., ethyl-(2,4,6-trimethylbenzoyl) phenyl phosphine oxide), and the like.

By the composition including a thioxanthone-based photopolymerization initiator, it is possible to reduce the surface tackiness of the printed portion of the recorded matter, in particular, it is possible to cure the printed portion surface and to prevent mixing and bleeding between dots in a thin film susceptible to oxygen inhibition. In addition, when both the acylphosphine oxide-based photopolymerization initiator and thioxanthone-based photopolymerization initiator are used, there is a tendency for the curing process using UV-LED to be superior, and for the curability and the adhesion of the composition to be superior, which is preferable.

As the thioxanthone-based photopolymerization initiator, it is preferable to include one type or more selected from a group consisting of thioxanthone, diethylthioxanthone, isopropylthioxanthone, and chloro thioxanthone. In addition, as the diethyl thioxanthone, 2,4-diethyl thioxanthone is more preferable, as the isopropylthioxanthone, 2-isopropylthioxanthone is more preferable, and, as the chlorothioxanthone, 2-chlorothioxanthone is more preferable. With a composition including such a thioxanthone-based photopolymerization initiator, there is a tendency for the curability, the storage stability, and the discharge stability to be superior. Among these, a thioxanthone-based photopolymerization initiator which includes diethylthioxanthone is even more preferable. By including diethylthioxanthone, there is a tendency to be able to convert the ultraviolet light (UV light) in a wide region to an active species more efficiently.

Specific examples of commercially available products of thioxanthone-based photopolymerization initiators include SPEEDCURE DETX (2,4-diethyl thioxanthone), SPEEDCURE ITX (2-isopropylthioxanthone), SPEEDCURE CTX (2-chlorothioxanthone), SPEEDCURE CPTX (1-chloro-4-propyl thioxanthone (the above are produced by Lambson Ltd.), and KAYACURE DETX (2,4-diethylthioxanthone) (produced by Nippon Kayaku Co., Ltd.).

The composition may further contain one type or two or more types of photo-radical polymerization initiators or photo-cationic polymerization initiators other than the above. Specific examples of photo-radical polymerization initiators other than the above include aromatic ketones, aromatic onium salt compounds, organic peroxides, thio compounds (thiophenyl group-containing compounds, and the like), α-aminoalkylphenone compounds, hexaarylbiimidazole compounds, ketoxime ester compounds, borate compounds, azinium compounds, metallocene compounds, active ester compounds, compounds having a carbon-halogen bond, and alkyl amine compounds.

Specific examples of commercially available products of the photo-radical polymerization initiator other than the above include IRGACURE 651 (2,2-dimethoxy-1,2-diphenylethane-1-one), IRGACURE 184 (1-hydroxy-cyclohexyl-phenyl-ketone), DAROCUR 1173 (2-hydroxy-2-methyl-1-phenyl-propane-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]phenyl}-2-methyl-propane-1-one}, IRGACURE 907 (2-methyl-1-(4-methylthiophenyl)-2-dimethylamino-1-(4-morpholinophenyl)-butanone-1), IRGACURE 379 (2-(dimethylamino)-2-[(4-methylphenyl) methyl]-1-[4-(4-morpholinyl) phenyl]-1-butanone), IRGACURE 784 (bis(η5-2,4-cyclopentadien-1-yl)-bis(2,6-difluoro-3-(1H-pyrrol-1-yl)-phenyl) titanium), IRGACURE OXE 01 (1.2-octanedione, 1-[4-(phenylthio)-, 2-(O-benzoyl oxime)]), IRGACURE OXE 02 (ethanone, 1-[9-ethyl-6-(2-methylbenzoyl)-9H-carbazol-3-yl]-, 1-(O-acetyl oxime)), IRGACURE 754 (mixture of oxyphenyl acetic acid, 2-[2-oxo-2-phenyl acetoxyethoxy] ethyl ester, and oxyphenyl acetic acid, 2-(2-hydroxyethoxy) ethyl ester) (the above are produced by BASF Corp.), SPEEDCURE TPO (produced by Lambson Ltd.), Lucirin TPO, LR8893, LR8970 (the above are produced by BASF Corp.), and UBECRYL P36 (produced by UCB Japan Co., Ltd.).

Specific examples of other photo-cationic polymerization initiators include sulfonium salt, and iodonium salt.

In a case where the composition is a radiation-curable composition, the content of the polymerization initiator is preferably 5.0 mass % or more and 20 mass % or less, more preferably 10 mass % or more and 18 mass % or less, and even more preferably 13 mass % or more and 16 mass % or less with respect to the total amount (100% mass %) of the composition. By setting the content in these ranges, the radiation curing speed is more fully exhibited and there is a tendency to be able to more effectively and reliably avoid unmelted photopolymerization initiator or coloring resulting from the polymerization initiator.

Polymerization Inhibitor

From the point of view of further improving the storage stability, the composition may include one type or two or more types of polymerization inhibitors. Specific examples of polymerization inhibitors include hindered amine compounds such as compounds having a 2,2,6,6-tetramethylpiperidine-N-oxyl skeleton, compounds having a 2,2,6,6-tetramethylpiperidine skeleton, compounds having a 2,2,6,6-tetramethylpiperidine-N-alkyl skeleton, and compounds having a 2,2,6,6-tetramethylpiperidine-N-acyl skeleton; p-methoxyphenol, hydroquinone monomethyl ether (MEHQ), hydroquinone, cresol, t-butyl catechol, 3,5-di-t-butyl-4-hydroxytoluene, 2,2'-methylenebis(4-methyl-6-t-butylphenol), 2,2'-methylene bis(4-ethyl-6-butylphenol), and 4,4'-thiobis(3-methyl-6-t-butylphenol). Examples of commercially available products include Irgastab UV-10 (trade name, produced by Ciba Specialty Chemicals Plc.) and the like.

In a case where the composition is a radiation-curable composition, the content of the photopolymerization inhibitor in the composition is preferably 0.01 mass % or more and 5.0 mass % or less, more preferably 0.1 mass % or more and 1.0 mass % or less, and even more preferably 0.2 mass % or more and 0.5 mass % or less with respect to the total amount (100 mass %) of the composition. By setting the content in these ranges, the radiation curing speed is more fully exhibited and there is a tendency to be able to more effectively and reliably avoid unmelted photopolymerization initiator or coloring resulting from the polymerization initiator.

Other Components

In addition to each of the components described above, the composition of the present embodiment may include one type or two or more types of optional components that may be used in ink jet ink compositions in the related art. Specific examples of such optional components include coloring material such as dyes, surfactants, penetrants, humectants, dissolution aids, viscosity modifiers, pH adjusting agents, antioxidants, preservatives, fungicides, corrosion inhibitors, chelating agents for capturing metal ions which affect dispersion, other additives, and solvents. Each of these may be used alone or used in a combination of two or more types.

Ink Jet Apparatus and Ink Jet Method

The ink jet apparatus of the present embodiment uses the housing described above and, as necessary, the housing described below and is provided with an ink jet head which discharges the composition using the ink jet method. In addition, the ink jet method of the present embodiment is provided with a discharge step in which the composition is discharged from the ink jet head. The ink jet method of the present embodiment is provided with a discharge step in which the composition is discharged from the ink jet head.

Figure 1:
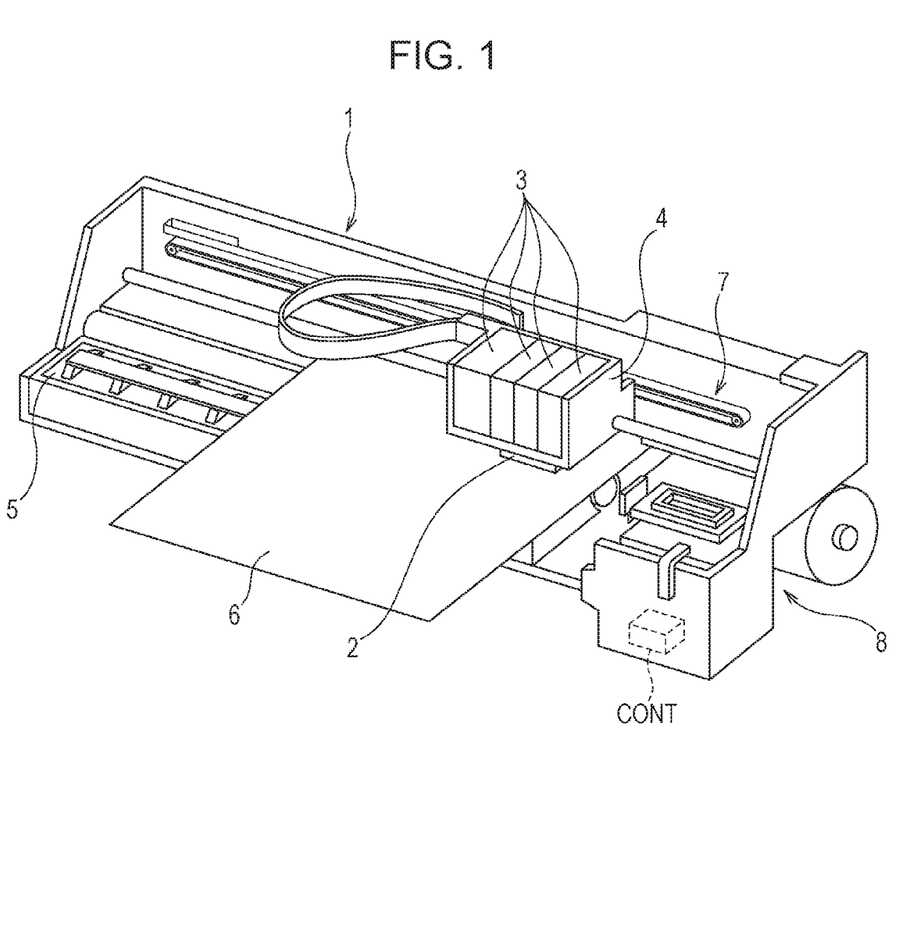
FIG. 1 is a perspective view schematically showing an example of an ink jet apparatus which can be used in the present embodiment.

As the ink jet apparatus, it is possible to use an ink jet printer (recording apparatus) which is known in the related art. For example, in a case where the composition is a composition including an organic solvent, it is possible to use the ink jet apparatus shown in FIG. 1. FIG. 1 is a perspective view schematically showing an example of an ink jet apparatus which may be used in the present embodiment.

FIG. 1 is a perspective view showing the configuration of a printer 1. As shown in FIG. 1, the printer 1 has a carriage 4 for mounting an ink jet recording head 2 and detachably mounting an ink cartridge 3, a platen 5 disposed below the ink jet recording head (ink jet head) 2 and on which a recording medium 6 is transported, a carriage moving mechanism 7 for moving the carriage 4 in the medium width direction (a main scanning direction S) of the target recording medium 6, and a media feeding mechanism 8 for transporting the recording medium 6 in a media feeding direction. In addition, the printer 1 has a control unit CONT for controlling the operations of the entire printer 1.

The recording head 2 has cavities for discharging the stored ink composition from a nozzle, discharge driving units provided for each of the cavities and imparting a discharge driving force to the ink, and nozzles provided for each of the cavities and discharging the ink composition to the outside of the head. The cavities and the discharge driving units and the nozzles provided for each of the cavities may be provided independently of each other or in a plurality in one head. It is possible for the discharge driving unit to be formed using an electromechanical transducer element such as a piezoelectric element for changing the volume of the cavity by mechanical deformation, an electronic transducer element for generating and discharging bubbles in ink by emitting heat, or the like. The printer 1 may be provided with one head for each color of ink or may be provided with a plurality of thereof.

The ink cartridge 3 is formed of a plurality of independent cartridges and each cartridge is filled with the ink composition described above. The platen 5 is provided with a platen heater and may be configured to be able to heat the target recording medium to a set temperature. By heating the target recording medium, the temperature of the recording head is also increased as a result and there is a tendency for the temperature of the ink stored in the recording head 2 to also increase. Although not shown, the printer 1 may be provided with an after heater on the recording medium transport path downstream of the platen heater.

As the printer 1, a so-called on-carriage type printer is exemplified where the ink cartridge 3 is mounted on the carriage 4; however, the printer 1 is not limited thereto. For example, the printer 1 may be a so-called off-carriage type in which supply is carried out to the head 2 via an ink supply tube after mounting an ink housing (for example, an ink pack, an ink cartridge, or the like) filled with the ink composition on the housing or the like of the printer 1.

For example, in a case where the composition is an ultraviolet-curable composition, the ink jet method may have a curing step for discharging the composition with respect to the target discharge object (for example, a target recording medium) and curing the composition attached to the target discharge object using radiation, preferably irradiation with ultraviolet rays. In addition, the ink jet apparatus of the present embodiment may be provided with an irradiation apparatus used in the curing step described above. In the irradiation step described above, as the radiation light source, it is preferable to use a metal halide lamp, a mercury lamp, an ultraviolet light-emitting diode, or the like, which are ultraviolet light sources, and, among these, an ultraviolet light-emitting diode is more preferable from the point of view of miniaturization and power saving. An ultraviolet light-emitting diode which has an emission peak wavelength which is preferably in a range of 360 nm or more and 420 nm or less is preferable in terms of availability. In addition, from the point of view of more fully curing the composition and from the point of view of shortening the time of the curing step, the irradiation energy of the radiation in the curing step is preferably 100 mJ/cm$^2$ or more and 1000 mJ/cm$^2$ or less, more preferably 200 mJ/cm$^2$ or more and 800 mJ/cm$^2$ or less, and even more preferably 300 mJ/cm$^2$ or more and 600 mJ/cm$^2$ or less. The configurations of ink jet apparatus and an ink jet method of the present embodiment are not particularly limited in other respects. For example, in other respects, the configurations may be configurations known in the related art.

Figure 2:
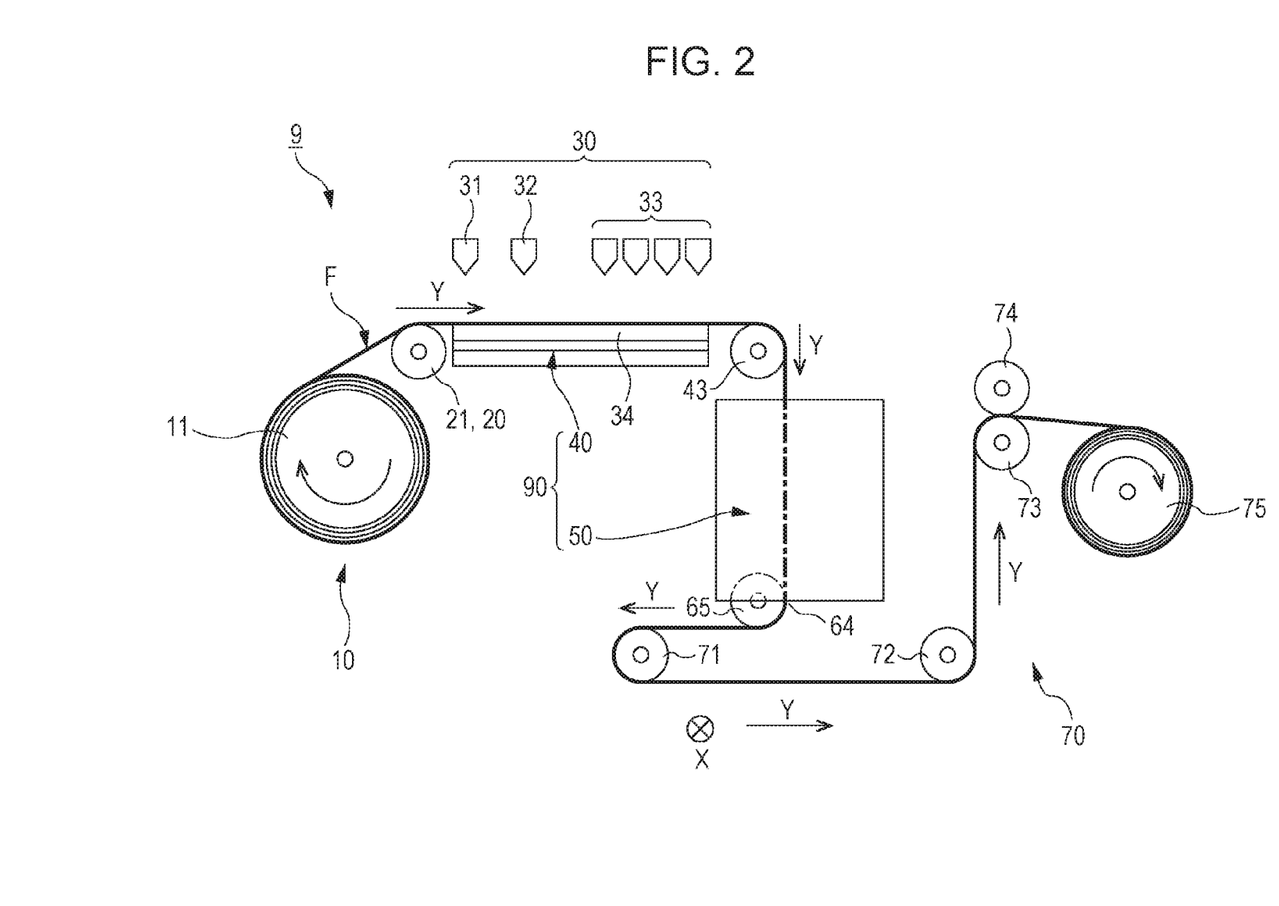
FIG. 2 is a schematic diagram showing an example of an ink jet apparatus which can be used in the present embodiment.
Figure 3:
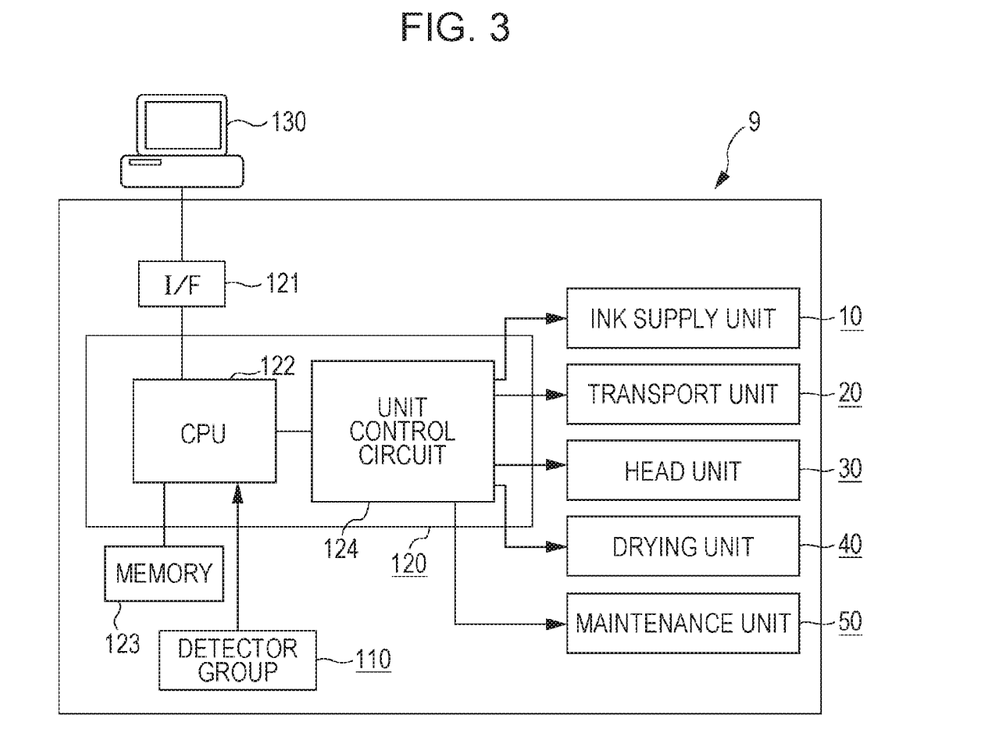
FIG. 3 is a functional block diagram showing an example of a configuration of an ink jet apparatus which can be used in the present embodiment.

In a case where the composition is an ultraviolet-curable composition, it is possible to use the ink jet apparatus shown in FIG. 2 and FIG. 3, for example. FIG. 2 is a schematic diagram showing an example of an ink jet apparatus which can be used in the present embodiment. As shown in FIG. 2, the ink jet recording apparatus 9 is provided with a feeding unit 10 for the target recording medium, a transport unit 20, a recording unit 30, a drying apparatus 90, and a discharge unit 70. In addition, the ink jet recording apparatus 9 is also provided with a pre-heater (not shown) as necessary and the target recording medium F is heated from the beginning as necessary.

Among the above, the drying apparatus 90 has, as necessary, a first drying unit 40 for carrying out a step in which the target recording medium is dried, and a second drying unit 50 for drying the recorded matter obtained using the ink jet method according to the present embodiment.

In addition, the feeding unit 10 is provided so as to be able to feed the roll-shaped target recording medium F to the transport unit 20. Specifically, the feeding unit 10 has a roll medium holder 11 and the roll medium holder 11 holds the roll-shaped target recording medium F. Then, the feeding unit 10 is configured so as to be able to feed the target recording medium F to the transport unit 20 on the downstream side in the feeding direction Y by rotating the roll-shaped target recording medium F.

Furthermore, the transport unit 20 is provided so as to be able to transport the target recording medium F fed from the feeding unit 10 to the recording unit 30. Specifically, the transport unit 20 has a first feeding roller 21 and is configured so as to be able to further transport the fed target recording medium F to the recording unit 30 on the downstream side in the feeding direction Y.

In addition, the recording unit 30 is provided so as to be able to carry out recording by applying a reaction liquid and discharging the ink composition onto the target recording medium F fed from the transport unit 20. Specifically, the recording unit 30 is provided with heads 31 and 32 for performing a reaction liquid attaching step, a recording head 33 for performing a color ink composition attaching step, and a platen 34 as a medium support unit.

Among the above, the platen 34 is provided so as to be able to support the target recording medium F from the rear side. In addition, the platen 34 is provided with the first drying unit 40 for drying the reaction liquid applied onto the target recording medium F and the ink composition discharged on the target recording medium F as necessary. Furthermore, a second feeding roller 43 is provided on the downstream side of the platen 34 in the feeding direction Y. Then, the second feeding roller 43 is configured so as to be able to feed the recorded target recording medium F to the second drying unit 50 on the downstream side in the feeding direction Y.

In addition, the second drying unit 50 is configured so as to be able to further dry the reaction liquid applied onto the target recording medium F and the ink composition discharged on the target recording medium F. Furthermore, a third feeding roller 65 is provided in the vicinity of an outlet 64 of the second drying unit 50. The third feeding roller 65 is provided so as to contact the rear surface of the target recording medium F and is configured so as to be able to feed the target recording medium F to the discharge unit 70 on the downstream side in the feeding direction Y.

Furthermore, the discharge unit 70 is provided so as to be able to feed the target recording medium F fed from the second drying unit 50 further to the downstream side in the feeding direction Y and to discharge the target recording medium F to the outside of the ink jet recording apparatus 1. Specifically, the discharge unit 70 has a fourth feed roller 71, a fifth feed roller 72, a sixth feed roller 73, a seventh feed roller 74, and a winding roller 75. Among these, the fourth feed roller 71 and the fifth feed roller 72 are disposed so as to be in contact with the surface of the target recording medium F. In addition, the sixth feed roller 73 and the seventh feed roller 74 are disposed so as to form a roller pair. Then, the target recording medium F discharged by the sixth feed roller 73 and the seventh feed roller 74 is provided so as to be wound by the winding roller 75.

FIG. 3 is a functional block diagram showing an example of the configuration of an ink jet apparatus which can be used in the present embodiment. A printer driver is installed in a computer 130 and, in order to record an image with the ink jet recording apparatus 9 (referred to below as the printer 9), outputs print data according to the image to the printer 1. The printer 9 has an ink supply unit 10, a transport unit 20, a head unit 30, a drying unit 40, a maintenance unit 50, a detector group 110, a memory 123, an interface 121, and a controller 120. The controller 120 has a CPU 122 and a unit control circuit 124. The printer 9 receiving print data from the computer 130 which is an external device controls various recording conditions by controlling each of the units using the controller 120, and records an image on the target recording medium in accordance with the print data. The conditions in the printer 9 are monitored by the detector group 110 and the detector group 110 outputs the detection results to the controller 120. The controller 120 controls each of the units based on the detection results output from the detector group 110 and records the print data input via the interface 121 to the memory 123. Control information for controlling each of the units is also recorded in the memory 123. The drying unit 40 is provided with a heater and blowing means and dries the composition such as the ink which is attached to the target recording medium. The computer 130 may be included in the recording apparatus.

Housing

The housing of the present embodiment is provided with the composition described above and a container which stores the composition. Examples of the form of the container include an ink cartridge, a pack, a bottle, a tank, a bottle, a cans, and the like. Among the above, an ink cartridge, a pack, a bottle, or a tank are versatile and easily control the transmission of steam to a desired value, which are therefore preferable, a pack is more preferable, and a film pack is even more preferable.

Specific examples of the constituent material of the container include polyethylene terephthalate (PET), polypropylene (PP), polyethylene, ethylene vinyl acetate copolymer, ethylene vinyl alcohol copolymer (EVOH), and polystyrene, and the constituent material may be a film of the above. The constituent material may be formed by blending the constituent material described above at an appropriate ratio, or overlapping a plurality of types of the films described above. In the case of films, the constituent material may be obtained by laminating the films. In a case where a plurality of types of films are overlapped, not all of the plurality of types of films need to be the films described above, but may be films where a part thereof is formed of another material, for example, metals or metal compounds.

In addition, it is preferable to include a plasticizer as a constituent material of the container from the point of view of improving the flexibility of the container. Examples of plasticizers include fatty acid esters, epoxy compounds, and polyester compounds. Among the above, fatty acid esters are preferable from the point of view of general versatility as a plasticizer, and specific examples of such fatty acid esters, include phthalic acid esters, adipic acid esters, trimellitic acid esters, and citric acid esters. Fatty acid esters may be used alone or in a combination of two or more types.

EXAMPLES

Detailed description will be given below of the present embodiment using Examples and Comparative Examples; however, the present embodiment is not limited to any one of the Examples or Comparative Examples below while not departing from the gist of the present embodiment.

The main materials for the solvent-based composition and the radiation-curable composition used in the following Examples and Comparative Examples are as follows.

For Dispersion
Aluminum Particles

Aluminum particles produced as follows: a film made of polyethylene terephthalate with a smooth surface (surface roughness Ra of 0.02 μm or less) was prepared and one surface of the film was entirely coated with silicone oil. Next, on the surface side coated with silicone oil, a film formed of Al is formed using a vapor deposition method. Next, the film (base material) formed of polyethylene terephthalate on which the Al film is formed is placed in a liquid formed of diethylene glycol diethyl ether, and subjected to ultrasonic vibration. Due to this, flaky particles made of Al (aluminum particles as the base particles) were obtained.

Surface Treatment Agent

Silanol-modified silicone (dual-terminal silanol dimethyl silicone oil, produced by Shin-Etsu Silicone Co., Ltd., trade name "X-21-5841")

Fluorine-containing silane compound ($CF_3(CF_2)_7$—$CH_2CH_2$—$Si(OCH_3)$, produced by Sigma-Aldrich Co. LLC.)

Alkyl phosphoric acid ester (mono n-octyl phosphate, produced by JOHOKU CHEMICAL CO., LTD.)

Fluorine-containing phosphoric acid ester ($CF_3(CF_2)_4(CH_2)_2O$—$PO(OH)_2$, produced by Sigma-Aldrich Co. LLC.) For Solvent-Based Composition Organic Solvent Diethylene glycol methyl ethyl ether (produced by Nippon Nyukazai Co., Ltd.)

Triethylene glycol monobutyl ether (produced by Nippon Nyukazai Co., Ltd.)

γ-butyrolactone (produced by Mitsubishi Chemical Corp.)
For Radiation-Curable Composition
Polymerizable Compound Acryloylmorpholine (produced by Kohjin Co., Ltd., abbreviated as "ACMO")

V#160 (produced by Hitachi Chemical Co., Ltd., benzyl acrylate, abbreviated as "BZA")
Polymerization Inhibitor Hydroquinone monomethyl ether (produced by Tokyo Chemical Industry Co., Ltd., abbreviated as "MEHQ")

Irgastab UV-10 (produced by Ciba Specialty Chemicals Plc., trade name UV-10)
Polymerization Initiator SPEEDCURE TPO (trade name, produced by Lambson Ltd, 2,4,6-trimethyl benzoyl-diphenyl-phosphine oxide, abbreviated as "TPO")

SPEEDCURE DETX (trade name, produced by Lambson Ltd, 2,4-diethyl thioxanthone, abbreviated as "DETX")
Preparation of Dispersion Each of the material was mixed with the compositions shown in Table 1 below and sufficiently stirred by reflux for 24 hours under a temperature of 50° C., and each of the Dispersions including the surface-treated metal powder was obtained. Here, in Table 1 below, the numerical units are parts by mass.

TABLE 1

|  | Dispersion 1 | Dispersion 2 | Dispersion 3 | Dispersion 4 | Dispersion 5 | Dispersion 6 | Dispersion 7 | Dispersion 8 | Dispersion 9 | Dispersion 10 |
|---|---|---|---|---|---|---|---|---|---|---|
| Propylene glycol monomethyl ether | 900 | 900 | 900 | 900 | 900 | 900 | 900 | 900 | 900 | 900 |
| Aluminum piece | 100 | 100 | 100 | 100 | 100 | 100 | 100 | 100 | 100 | 100 |
| Silanol-modified silicone | 5.0 | — | — | — | — | — | — | — | — | — |
| Fluorine-containing silane compound | — | 5.0 | — | — | — | — | — | — | — | — |
| Alkyl phosphoric acid ester | — | — | 5.0 | — | — | — | — | — | — | — |
| Fluorine-containing phosphoric acid ester | — | — | — | — | 0.3 | 2.0 | 5.0 | 6.7 | 10 | 20 |

Preparation of Solvent-Based Composition

Each of the materials was mixed with the compositions shown in Table 2 below and sufficiently stirred, and each of the compositions was obtained. Here, in Table 2 below, the numerical units are mass % and the total is 100.0 mass %.

TABLE 2

|  | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|
| Dispersion | Dispersion 1 | Dispersion 2 | Dispersion 3 | Dispersion 6 | Dispersion 7 | Dispersion 8 | Dispersion 9 | Dispersion 4 | Dispersion 5 | Dispersion 10 |
|  | 15.0 | 15.0 | 15.0 | 15.0 | 15.0 | 15.0 | 15.0 | 15.0 | 15.0 | 15.0 |
| Diethylene glycol methyl ethyl ether | 59.0 | 59.0 | 59.0 | 59.0 | 59.0 | 59.0 | 59.0 | 59.0 | 59.0 | 59.0 |
| Triethylene glycol monobutyl ether | 8.0 | 8.0 | 8.0 | 8.0 | 8.0 | 8.0 | 8.0 | 8.0 | 8.0 | 8.0 |
| γ-butrolactone | 18.0 | 18.0 | 18.0 | 18.0 | 18.0 | 18.0 | 18.0 | 18.0 | 18.0 | 18.0 |
| Dissolved oxygen reduction rate [kPa/h] | 20 | 18 | 18 | 20 | 15 | 10 | 2.0 | 25 | 25 | 1.0 |
| Storage stability 1 | C | B | B | B | A | A | A | D | D | A |
| Discharge stability | A | A | A | A | A | A | B | D | A | C |
| Glossiness | B | B | B | B | A | A | A | D | A | A |

Preparation of Radiation-Curable Composition

Each of the materials was mixed with the compositions shown in Table 3 below and sufficiently stirred, and each of the compositions was obtained. Here, in Table 3 below, the numerical units are mass % and the total is 100.0 mass %.

TABLE 3

|  | Example 8 | Example 9 | Example 10 | Example 11 | Comparative Example 4 | Comparative Example 5 | Comparative Example 6 |
|---|---|---|---|---|---|---|---|
| Dispersion | Dispersion 6 | Dispersion 7 | Dispersion 8 | Dispersion 9 | Dispersion 4 | Dispersion 5 | Dispersion 10 |
|  | 15.0 | 15.0 | 15.0 | 15.0 | 15.0 | 15.0 | 15.0 |
| ACMO | 39.6 | 39.6 | 39.6 | 39.6 | 39.6 | 39.6 | 39.6 |
| BZA | 30.0 | 30.0 | 30.0 | 30.0 | 30.0 | 30.0 | 30.0 |
| MEHQ | 0.2 | 0.2 | 0.2 | 0.2 | 0.2 | 0.2 | 0.2 |
| UV-10 | 0.2 | 0.2 | 0.2 | 0.2 | 0.2 | 0.2 | 0.2 |
| TPO | 13.0 | 13.0 | 13.0 | 13.0 | 13.0 | 13.0 | 13.0 |
| DETX | 2.0 | 2.0 | 2.0 | 2.0 | 2.0 | 2.0 | 2.0 |
| Dissolved oxygen reduction rate [kPa/h] | 20 | 15 | 10 | 2.0 | 25 | 25 | 1.0 |
| Storage stability 2 | B | A | A | A | D | D | A |
| Discharge stability | A | A | A | B | D | A | C |
| Glossiness | B | A | A | A | D | A | A |

In the compositions in all of the Examples and Comparative Examples, the average thickness of the metal powder included in the composition was measured by TEM and all were in a range of 1.0 nm to 100 nm. In addition, the average particle diameter of the metal powder was measured by the light scattering method and all were in a range of 0.2 μm to 3.0 μm. Furthermore, the maximum particle diameters of the metal powders were measured by the light scattering method and all were 5.0 μm or less.

Physical Properties 1
Dissolved Oxygen Reduction Rate 100 mL of the obtained composition was transferred to a plastic cup, and the measurement of the dissolved oxygen amount was started using a dissolved oxygen amount measuring device (produced by HachUltra Co., Ltd., trade name "Model 3660 EX") while stirring the composition in the plastic cup in an environment of 25° C. and 1.0 atm. Looking at the changes over time, the stirring was stopped when the increase in the dissolved oxygen amount stopped and the value of the dissolved oxygen amount at that time was set as the initial value. The measurement of the dissolved oxygen amount was continued, the dissolved oxygen amount was confirmed every ten minutes from the stopping of the stirring, the time until the reduction in the dissolved oxygen amount stopped after the stopping of the stirring was determined along with the dissolved oxygen amount at the time when the reduction in the dissolved oxygen amount stopped, and the dissolved oxygen reduction rate was determined using the following expression. Here, for the determination of whether or not the reduction of the dissolved oxygen amount was stopped, the reduction was determined to be stopped in a case where the reduction amount from the dissolved oxygen amount ten minutes earlier was 3% or less. The evaluation results are shown in Table 2 and Table 3.

Dissolved oxygen reduction rate (kPa/h)=(Initial value (kPa)−dissolved oxygen amount when the reduction of the dissolved oxygen amount was stopped (kPa))/(Time until reduction of dissolved oxygen amount stopped (h))

Evaluation 1
Storage Stability 1

After storing 100 g of each composition obtained in Examples 1 to 7 and Comparative Examples 1 to 3 in a 110 mL screw-top tube (40ϕ×120 mm), the screw-top tube was sealed and left to stand for 24 hours at normal temperature, and the absorbance of the composition before being left to stand and the absorbance of the supernatant after being left to stand were measured. That is, the absorbance of the composition before being left to stand was measured using a spectrophotometer manufactured by Hitachi High-Tech Science Corp., 5 g of the supernatant of the composition after being left to stand was taken and then the absorbance was measured in the same manner, and the degree of sedimentation was calculated using the following expression. The storage stability was evaluated based on the results and the following evaluation criteria. The evaluation results are shown in Table 2.

Sedimentation rate (%) (initial absorbance absorbance after being left to stand)/(initial absorbance)

A: less than 10%
B: 10% or more and less than 15%
C: 15% or more and less than 20%
D: 20% or more Evaluation 2
Storage Stability 2
Gelling After storing 100 mL of each of the compositions obtained in Examples 8 to 11 and Comparative Examples 4 to 6 in aluminum packs, the aluminum packs were sealed and left to stand for 5 days at 60° C., and the changes in the viscosity thereof were measured. That is, the viscosity at 20° C. before and after the storage was measured using a viscometer manufactured by Phisica Co., Ltd., and the percentage increase in the viscosity of the composition after storage with respect to the viscosity of the composition before storage was calculated (the viscosity percentage increase). The storage stability was evaluated based on the results thereof and the following evaluation criteria. The evaluation results are shown in Table 3.

A: less than 5%
B: 5% or more and less than 10%
C: 10% or more and less than 20%
D: 20% or more Evaluation 3
Discharge Stability An ink jet printer (manufactured by Seiko Epson Corp., model "SC-570650") was filled with each composition obtained in Examples 1 to 7 and Comparative Examples 1 to 3, the compositions were discharged from an ink jet head provided with 360 nozzles, and a solid pattern was continuously formed (L dots, 600×600 dpi) for 30 seconds on plain paper Xerox-P (produced by Xerox Corp., A4 size) which is a target recording medium. From the solid pattern formed on the plain paper, the number of defects such as missing dots was counted. In addition, solid patterns were formed in the same manner for each of the compositions obtained in Examples 8 to 11 and Comparative Examples 4 to 6 except that the ink jet printer (manufactured by Seiko Epson Corp., Model "SC-S70650") was changed to an ink jet printer PX-G930 (manufactured by Seiko Epson Corp.) provided with 360 nozzles, and the number of defects such as missing dots was counted. The discharge stability was evaluated based on the results and the following evaluation criteria. The evaluation results are shown in Table 2 and Table 3.

A: the number of defects was less than 60
B: the number of defects was 60 or more and less than 120
C: the number of defects was 120 or more and less than 180
D: the number of defects was 180 or more Evaluation 4
Glossiness Each composition obtained in the Examples and Comparative Examples was applied onto a base material (vinyl chloride sheet) using a #6 bar coater, dried at 50° C. for 2 minutes and left to stand for 24 hours at room temperature, and the glossiness at 60° C. was measured using a glossmeter manufactured by HORIBA, Ltd. The glossiness was evaluated based on the results and the following evaluation criteria. The evaluation results are shown in Table 2 and Table 3.

A: 300 or more
B: 200 or more and less than 300
C: 100 or more and less than 200
D: less than 100

According to a comparison of the Examples and Comparative Examples shown in Table 2 and Table 3, using the ink jet composition according to the invention, it was understood that excellent storage stability and discharge stability were obtained, and a coating film with excellent glossiness was obtained.

The entire disclosure of Japanese Patent Application No. 2015-168296, filed Aug. 27, 2015 is expressly incorporated by reference herein.

What is claimed is:

1. A non-aqueous ink jet composition comprising:
at least one polymerizable compound selected from the group consisting of:
an unsaturated carboxylic acid selected from the group consisting of (meth)acrylic acid, itaconic acid, crotonic acid, isocrotonic acid, and maleic acid;
a salt of the unsaturated carboxylic acids;
an ester, urethane, amide, or anhydride of the unsaturated carboxylic acids:
an acrylonitrile;
a styrene;
an unsaturated polyester;
an unsaturated polyether;
an unsaturated polyamide; and
an unsaturated urethane; and
a surface-treated metal powder,
wherein a dissolved oxygen reduction rate is 2.0 kPa/h or more and 20.0 kPa/h or less in an environment of 25° C. and 1.0 atm, and
wherein the surface-treated metal powder is surface-treated with one or more surface treatment agents selected from the group consisting of fluorine-containing phosphoric acid esters, fluorine-containing silane compounds, and combinations thereof.

2. The non-aqueous ink jet composition according to claim 1,
wherein the surface-treated metal powder includes aluminum or an aluminum alloy, and wherein a part of a surface of the metal powder is exposed.

3. The non-aqueous ink jet composition according to claim 1,
wherein a shape of the surface-treated metal powder is flakes.

4. The non-aqueous ink jet composition according to claim 1,
wherein the non-aqueous ink jet composition is a solvent-based composition or a radiation-curable composition.

5. The non-aqueous ink jet composition according to claim 1,
wherein the surface-treated metal powder is 0.5 mass % or more and 10.0 mass % or less with respect to a total amount of the ink jet composition.

6. The non-aqueous ink jet composition according to claim 3,
wherein an average thickness of the surface-treated metal powder is 1.0 nm or more and 100.0 nm or less, and an average particle diameter of the surface-treated metal powder is 0.1 µm or more and 300.0 µ or less.

7. A housing comprising:
the non-aqueous ink jet composition according to claim 1; and
a container which stores the ink jet composition.

8. A housing comprising:
the non-aqueous ink jet composition according to claim 2; and
a container which stores the ink jet composition.

9. A housing comprising:
the non-aqueous ink jet composition according to claim 3; and
a container which stores the ink jet composition.

10. A housing comprising:
the non-aqueous ink jet composition according to claim 4; and
a container which stores the ink jet composition.

11. A housing comprising:
the non-aqueous ink jet composition according to claim 5; and
a container which stores the ink jet composition.

12. A housing comprising:
the non-aqueous ink jet composition according to claim 6; and
a container which stores the ink jet composition.

13. An ink jet method comprising:
discharging the non-aqueous ink jet composition according to claim 1 from an ink jet head.

14. An ink jet method comprising:
discharging the non-aqueous ink jet composition according to claim 2 from an ink jet head.

15. An ink jet method comprising:
discharging the non-aqueous ink jet composition according to claim 3 from an ink jet head.

16. An ink jet method comprising:
discharging the non-aqueous ink jet composition according to claim 4 from an ink jet head.

17. An ink jet method comprising:
discharging the non-aqueous ink jet composition according to claim 5 from an ink jet head.

18. The non-aqueous ink jet composition according to claim 1, wherein the fluorine-containing phosphoric acid esters are represented by the formula:

$POR_n(OH)_{3-n}$, where R is one of $CF_3(CF_2)_m-$, $(CF_3)(CF_2)_m(CH_2)_1-$, $CF_3(CF_2)_m(CH_2O)_1-$, $CF_3(CF_2)_m(CH_2CH_2O)_1-$, $CF_3(CF_2)_mO-$, and $CF_3(CF_2)_m(CH_2)_1O-$, is an integer of 1 to 3, m is an integer of 2 to 18, and 1 is an integer of 1 to 18.

19. The non-aqueous ink jet composition according to claim 1, wherein the fluorine-containing silane compounds are selected from the group consisting of $CF_3-CH_2CH_2-Si(OCH_3)_3$, $CF_3(CF_2)_3-CH_2CH_2-Si(OCH_3)_3$, $CF_3(CF_2)_5-CH_2CH_2-Si(OCH_3)_3$, $CF_3(CF_2)_5-CH_2CH_2-Si(OC_2H_5)_3$, $CF_3(CF_2)_7-CH_2CH_2-Si(OCH_3)_3$, $CF_3(CF_2)_{11}-CH_2CH_2-Si(OC_2H_5)_3$, $CF_3(CF_2)_3-CH_2CH_2-Si(CH_3)(OCH_3)_2$, $CF_3(CF_2)_7-CH_2CH_2-Si(CH_3)(OCH_3)_2$, $CF_3(CF_2)_8-CH_2CH_2-Si(CH_3)(OC_2H_5)_2$, $CF_3(CF_2)_8-CH_2CH_2-Si(C_2H_5)(OC_2H_5)_2$, $CF_3O(CF_2O)_6-CH_2CH_2-Si(OC_2H_5)_3$, $CF_3O(C_3F_6O)_4-CH_2CH_2-Si(OCH_3)_3$, $CF_3O(C_3F_6O)_2(CF_2O)_3-CH_2CH_2-Si(OCH_3)_3$, $CF_3O(C_3F_6O)_8-CH_2CH_2-Si(OCH_3)_3$, $CF_3O(C_4F_9O)_5-CH_2CH_2-Si(OCH_3)_3$, $CF_3O(C_4F_9O)_5-CH_2CH_2-Si(CH_3)(OC_2H_5)_2$, $CF_3O(C_3F_6O)_4-CH_2CH_2-Si(C_2H_5)(OCH_3)_2$, and combinations thereof.

* * * * *